A. A. BAUMANN.
PLUMB LEVEL.
APPLICATION FILED FEB. 11, 1909.
957,834.
Patented May 10, 1910.
2 SHEETS—SHEET 1.
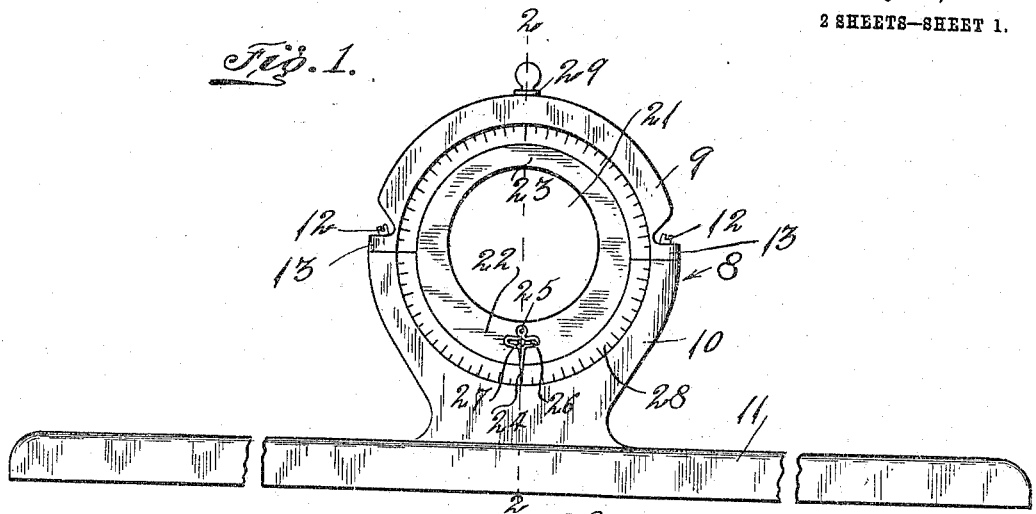
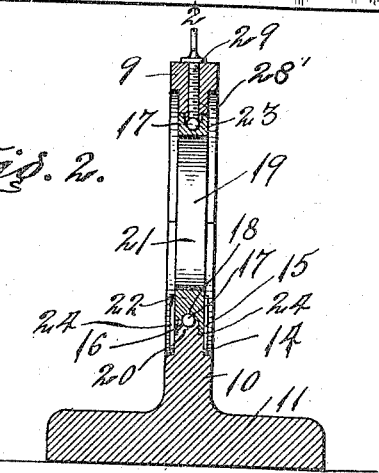
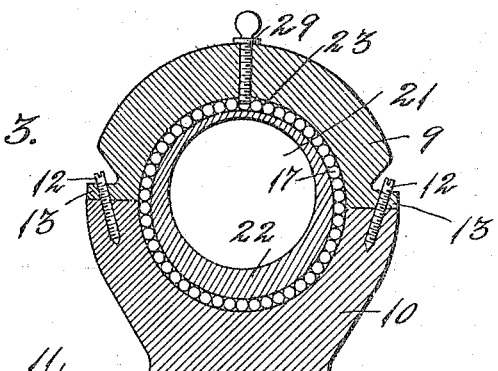
Witnesses
Jos Gregory
Inventor
Albert A. Baumann
By
Attorneys

A. A. BAUMANN.
PLUMB LEVEL.
APPLICATION FILED FEB. 11, 1909.

957,834.

Patented May 10, 1910.
2 SHEETS—SHEET 2.

Inventor
Albert A. Baumann.

Witnesses
Jos Gregory.

By
Attorneys

UNITED STATES PATENT OFFICE.

ALBERT A. BAUMANN, OF WAUWATOSA, WISCONSIN.

PLUMB-LEVEL.

957,834.     Specification of Letters Patent.     Patented May 10, 1910.

Application filed February 11, 1909. Serial No. 477,361.

*To all whom it may concern:*

Be it known that I, ALBERT A. BAUMANN, a citizen of the United States, residing at Wauwatosa, in the county of Milwaukee, State of Wisconsin, have invented certain new and useful Improvements in Plumb-Levels; and I do hereby declare the following to be a full, clear, and exact description of the invention, such as will enable others skilled in the art to which it appertains to make and use the same.

The invention relates to a leveling device or instrument and more particularly to the class of plumb levels.

The primary object of the invention is the provision of a leveling device or instrument in which a rotatable gravitating member carrying a pointer is adapted to move in a casing formed of separable sections, the latter having fixed thereto a graduated scale circumscribing said gravitating member and coöperative with the pointer to determine the level with respect to the work when the device or instrument is applied thereto.

Another object of the invention is the provision of a leveling device or instrument in which a level can be readily and quickly ascertained, and means for accurately adjusting the indicator or pointer means on the instrument or device whereby the latter will be properly regulated for accuracy in operation.

A further object of the invention is the provision of a leveling device or instrument in which a rotary gravitating member is supported in a casing formed of separable sections, the latter having a graduated scale over which traverses a pointer carried by the gravitating member to indicate a level, and ball bearings interposed between the said gravitating member and casing so as to enable the proper working of the instrument with accuracy when in operation.

With these and other objects in view the invention consists in the construction, combination and arrangement of parts as will be hereinafter more fully described in detail, illustrated in the accompanying drawings which disclose the preferred form of embodiment of the invention and as pointed out in the claim hereunto appended.

It is of course to be understood that changes, variations and modifications may be resorted to such as come properly within the scope of the appended claim without departing from the spirit or sacrificing any of the advantages of the invention.

Figure 4:
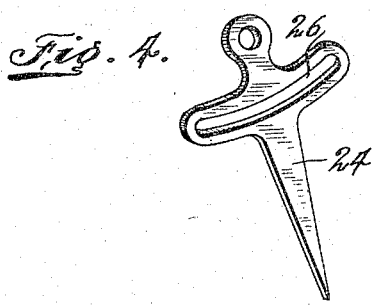
Figure 5:
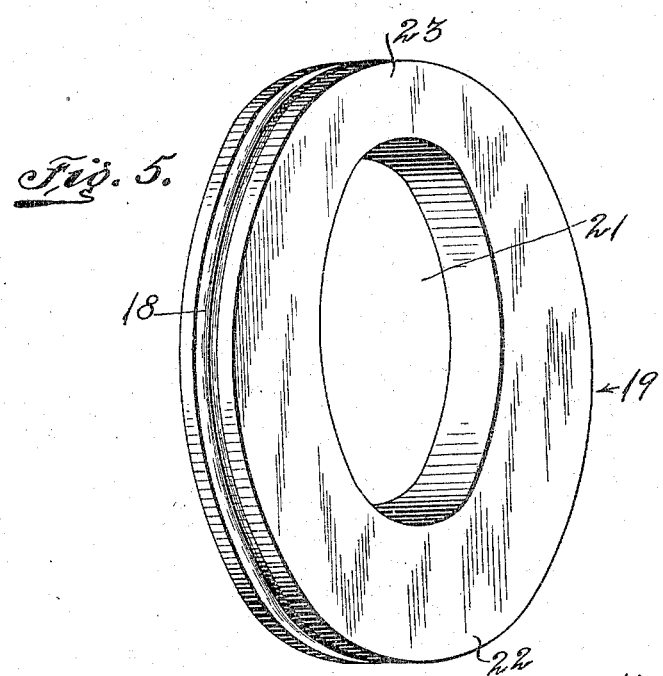
Figure 6:
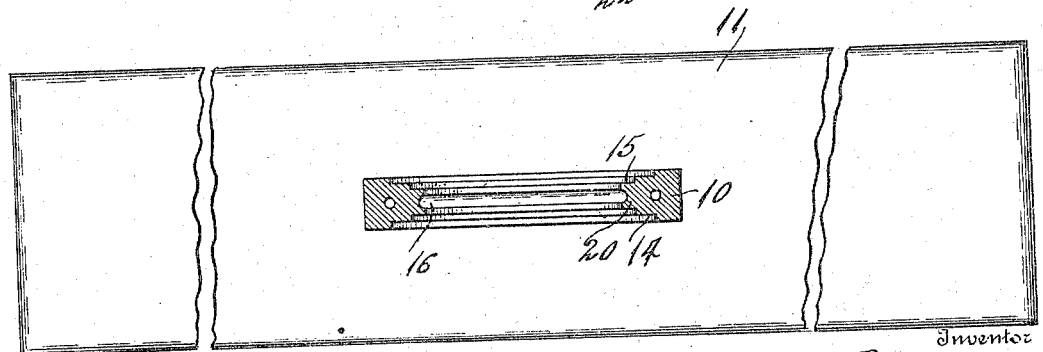

In the drawings: Figure 1 is a front elevation of the invention. Fig. 2 is a sectional view on the line 2—2 of Fig. 1. Fig. 3 is a central longitudinal sectional view through the instrument or device. Fig. 4 is a detail view of one of the pointers. Fig. 5 is a detail perspective view of the rotary gravitating member removed from the instrument. Fig. 6 is a plan view of the lower section of the casing with the gravitating member removed.

Similar reference characters indicate corresponding parts throughout the several views in the drawings.

In the drawings, the numeral 8 designates generally a casing which may be of any suitable material although the same is formed preferably of metal and comprises an upper and lower section 9 and 10 respectively, the said lower section 10 formed with a flat elongated base 11 so as to permit the setting or mounting of the instrument upon the work when brought into operation.

Each of the sections 9 and 10 respectively, is formed with a semi-circular opening so that when the upper section is mounted upon the lower section the said semi-circular openings therein will produce a complete circular opening. The upper section 9 is detachably secured to the lower section 10 by screw fasteners 12 which latter are threaded into ears 13 formed from and projecting laterally of the upper section.

In opposite faces of the upper and lower sections 9 and 10 are formed rabbeted portions 14 and 15 circumscribing the circular opening formed by the said sections and the inner face of the circular opening is formed with an annular groove 16 forming a raceway for a series of ball bearings 17 the latter also engaging an annular raceway formed by an annular groove 18 in the outer edge of a rotatable gravitating member or disk 19 and into which groove projects the reduced portion 20 formed by the rabbeted portions 15 in the sections 9 and 10 respectively. It is obvious by the interfitting of the reduced portion 20 in the annular groove 18 formed in the upper and lower sections prevents accidental detachment or displacement of the gravitating member or disk.

Formed eccentrically with respect to the axis of rotation of the gravitating member or disk 19 is a circular opening 21 so as to form a widened portion 22 with respect to the narrow portion 23 at a diametrically opposite point on the gravitating member and in this manner the said member or disk 19 will gravitate. Mounted on opposite sides of the gravitating member or disk at a point of the widened portion 22 thereof are pointer members 24 which latter are pivoted as at 25 and contain arcuate shaped slots 26 through which pass set screws or pins 27 so as to lock the pointers in adjusted position within a limited degree of an arc of a circle.

Formed in the rabbeted sections 14 in opposite faces of the upper and lower sections 9 and 10 are graduated marks or degree marks 28 ranging from zero to one hundred and eighty degrees over which travel the pointer members 24 which latter are adapted to indicate the degree of inclination of work when the instrument or device is applied thereto.

It will be manifest that the instrument or device can be used to determine the inclination by applying the same to the body to be leveled and the pointer members will always point to the plumb line which can be observed from either side of the device or instrument and in this manner the inclination of the body to be leveled can be ascertained no matter to which side the said instrument or device may be turned.

Contained in the upper section 9 is a recess 28′ in communication with the raceway formed by the annular groove 18 in the gravitating member or disk 19 and in which recess the ball bearings 17 are adapted to be introduced into the said raceway. This recess 28 is closed by a screw plug 29 which latter has its inner end projecting a slight distance into the annular groove 18 formed in the gravitating member 19 and is concaved to correspond to the shape of said groove to permit the passage of the balls also to aid in holding the member against accidental displacement in the casing.

It is thought the operation will be thoroughly apparent and therefore a further description of the device is deemed unnecessary in view of the foregoing so a fuller description is omitted.

What is claimed is—

A level of the class described comprising a casing formed of separable sections and having a circular opening the inner wall of the opening containing an annular raceway, a rotary gravitating member supported within the circular opening and containing an annular raceway registering with the first named raceway, the said gravitating member containing an eccentric opening to effect gravitating movement of the member, a series of ball bearings disposed in said raceway, a graduated scale being provided on the casing circumscribing said circular opening, a pointer carried by the member and adapted to travel over the scale, and means permitting arcuate adjustment of the pointer.

In testimony whereof, I affix my signature, in presence of two witnesses.

ALBERT A. BAUMANN.

Witnesses:
 HENRY WATNER,
 OTTO ULRICH.